US006827006B1

(12) United States Patent
D'Amato et al.

(10) Patent No.: US 6,827,006 B1
(45) Date of Patent: Dec. 7, 2004

(54) CHICKEN LEG GRILL RACK

(75) Inventors: Jim D'Amato, Glen Rock, NJ (US); John Battaglia, Westwood, NJ (US)

(73) Assignee: E&Z Products, LLC, Glen Rock, NJ (US)

( * ) Notice: Subject to any disclaimer, the term of this patent is extended or adjusted under 35 U.S.C. 154(b) by 15 days.

(21) Appl. No.: 10/625,139

(22) Filed: Jul. 23, 2003

(51) Int. Cl.[7] .............................................. A47J 43/18
(52) U.S. Cl. ........................ 99/426; 99/448; 211/181.1
(58) Field of Search .......................... 99/426, 448, 449; 211/181.1, 175, 60.1

(56) References Cited

U.S. PATENT DOCUMENTS 1,514,345 A * 11/1924 Crimmel ..................... 211/74
3,214,031 A * 10/1965 McCauley ................. 211/41.2
5,730,046 A * 3/1998 Battaglia et al. ............. 99/426

* cited by examiner

Primary Examiner—Reginald L. Alexander
(74) Attorney, Agent, or Firm—Richard A. Joel, Esq

(57) ABSTRACT

A rack for grilling chicken legs comprises a unitary wire structure including a base and inclined upwardly extending members at each end of the base and a transverse/portion joining the tops of the members. A plurality of substantially U-shaped members are mounted to the transverse member at the legs forming the open end of the "U". The legs of the U-shaped members form a parallel slot between adjacent members to engage and support a plurality of chicken legs in a vertical position above grill.

11 Claims, 3 Drawing Sheets

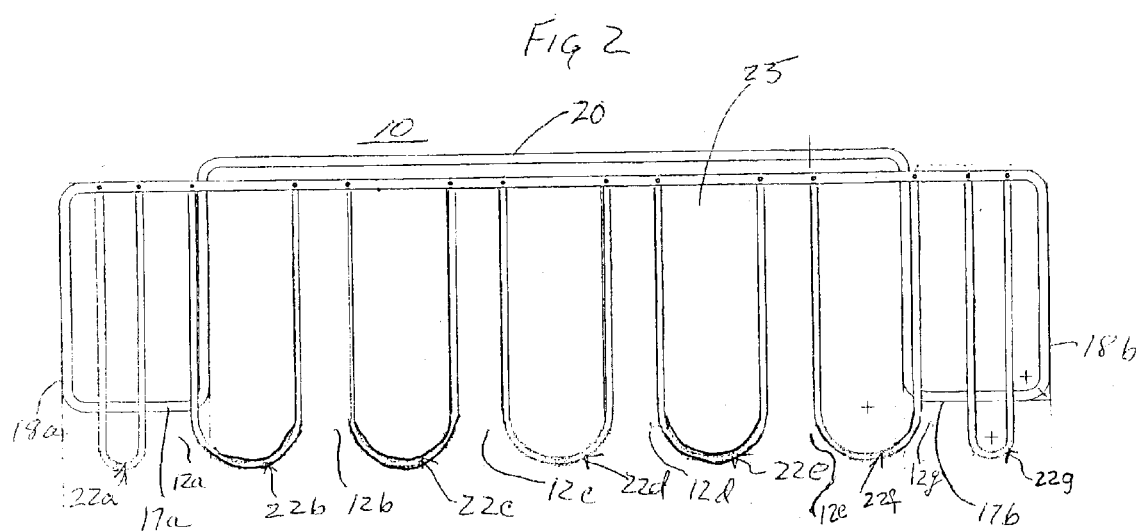
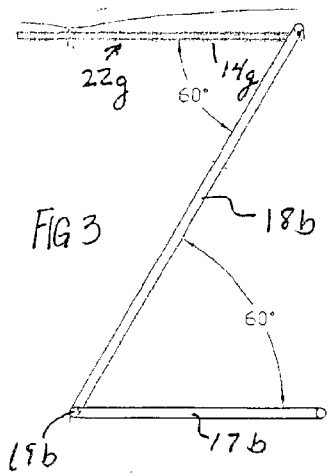

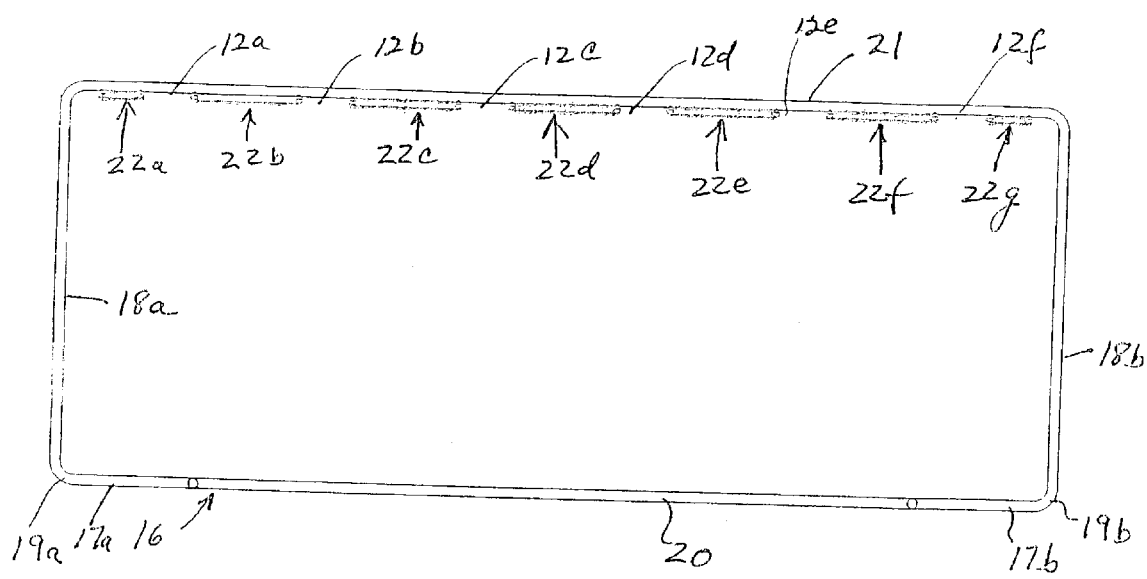

CHICKEN LEG GRILL RACK

BACKGROUND OF THE INVENTION

This invention relates to cooking facilities and particularly to a new and inexpensive rack for grilling chicken legs in a new and improved manner.

In barbecuing chicken legs, it is extremely difficult to cook the legs uniformly without burning. The legs must be constantly watched and rotated on the grill. Unfortunately, even with considerable attention, it is quite easy to burn the legs or cook the legs in a non-uniform manner. The present invention is designed to permit uniform cooking of a plurality of chicken legs without the problems associated with prior art method. The invention comprises a unique rack which holds the legs in a vertical position spaced at a predetermined distance above the fire for uniform cooking without the problem of burning.

In the prior art, U.S. Pat. No. 2,269,310 discloses a display device for supporting and displaying axe and shovel handles. The device includes a plurality of spaced parallel slots with openings at one end. The device is for a use different from the present invention and apart from apparent similarity of parallel slots, is different in structure.

U.S. Pat. No. 5,730,046 to Battaglia, et al discloses a rack for grilling chicken legs in a barbecue comprising a flat elongated rack surface including a plurality of slots to hold chicken legs in a vertical position at a predetermined distance above the grill. The slots are sized to support chicken legs by engaging the leg joint with the meaty leg portion extending vertically below the flat rack surface. Applicant's invention is an improvement on this design.

U.S. Pat. No. 4,559,869 is directed to an adjustable barbecue rack for supporting a plurality of spareribs. The device includes a plurality of racks removably secured to a main rack. Another version of a barbecue rack is shown in U.S. Pat. No. 4,458,585 wherein a cooking surface is defined by spaced rods formed in a particular manner.

Other patents of general interest include U.S. Pat. Nos. 4,677,906; 4,583,647; 4,765,584; 4,184,592; and, 4,542,684. None of the prior art patents mentioned above affect the patentability of the present invention which relates to a unique, efficient and inexpensive rack for grilling chicken legs.

SUMMARY OF THE INVENTION

This invention relates to cooking devices and particularly to a device or rack for grilling chicken legs on a barbecue marketed as the E*Z Legs rack. The prior art devices for grilling chicken legs were generally no more than an open grill where the legs had to be constantly rotated to prevent burning. While the concept of supporting chicken legs vertically over a grill is also disclosed in the prior art, such designs are relatively expensive and bulky an lack the features of the present invention. In the present invention, the legs are suspended from a specially designed wire rack at a predetermined distance above the fire to permit uniform cooking without burning.

The unique rack of the present invention comprises a unitary wire structure having a base, upwardly extending members at each end of the base, a transverse member joining the tops of the upwardly extending members and a plurality of substantially U-shaped members mounted to the transverse member at the open end of the "U". The legs of the U-shaped members form a parallel slot between adjacent members to engage and support a plurality of chicken legs in a vertical position. The wire base is merely placed on a barbecue and the legs uniformly cooked in the parallel slots. The legs are readily removed from the slots with a fork or specialty tool.

Accordingly, an object of this invention is to provide a new and improved barbecue grilling device for chicken legs.

Another object of this invention is to provide a new and improved inexpensive barbecue rack for uniformly grilling chicken legs.

A further object of this invention is to provide a new and improved wire barbecue rack wherein a plurality of chicken legs may be mounted in an upside down position with the meaty portion extending downwardly from parallel slots formed by wires to permit uniform grilling and preventing burning.

A more specific object of this invention is to provide a new and improved wire rack for grilling chicken legs and the like which is pivotally mounted to the barbecue cover to swing into and out of a cooking position and which includes a plurality of spaced parallel slots for insertion of chicken legs to hold the legs in an upside down position at a predetermined distance above the fire.

BRIEF DESCRIPTION OF DRAWINGS

The above and other objects and advantages of the present invention may be more clearly seen when viewing in conjunction with the accompanying drawings wherein.

FIG. 2 is a top view of the invention illustrating the mounting slots on the unique rack comprising the invention.

FIG. 3 is a side view of the invention with the chicken legs suspended from the rack; and FIG. 4 is a front view of the invention.

DETAILED DESCRIPTION

Figure 1:
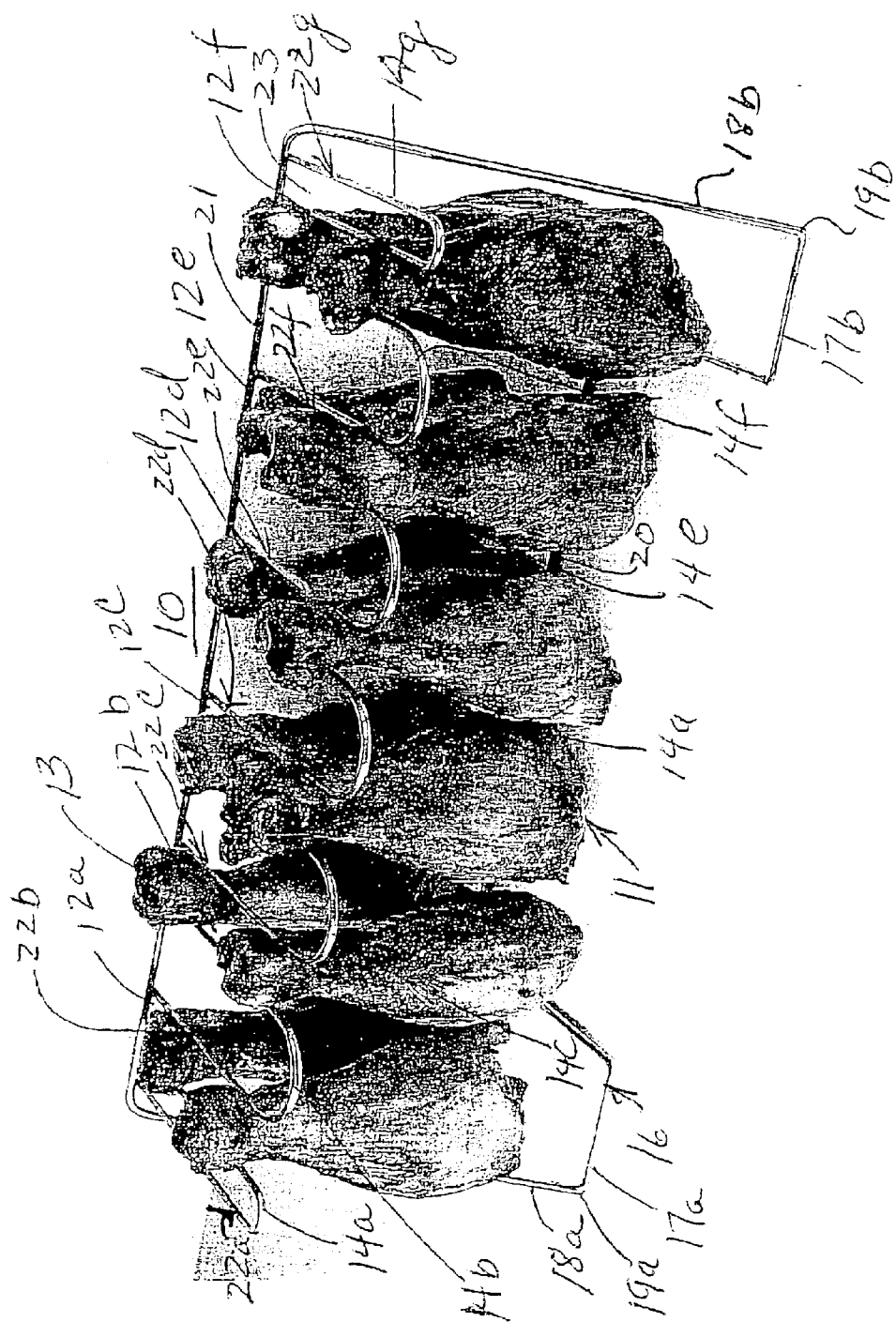
FIG. 1 is a perspective view of the invention showing the chicken legs suspended above the grill.

Referring now to the drawings, the invention comprises a unique wire rack 10 for grilling chicken legs 11 vertically in a barbecue. The rack 10, as shown in the perspective view of FIG. 1, supports a plurality of chicken legs 11 in a plurality of slots 12a–f above the grill. The chicken legs 11 are placed in the slots 12a–f with the leg joint 13 held in place by the U-shaped members 14a–g forming the slots sides and the meaty portion 15 of the leg extending downwardly above the grill. The rack 10 is then placed on the grill.

The base 16 of the rack 10 comprises a pair of spaced end portions 17a, 17b which extend for a predetermined distance in the same plane for approximately two inches and then rearwardly in a parallel relationship for approximately three inches to a transverse member 20 which connects the end portions 17a, 17b. The base footprint may comprise other styles and configurations such as circles, rectangles, etc., in further embodiments of the invention.

A pair of inclined members 18a and 18b extend upwardly form the end portions 17a, 17b respectively at their outer edge 19a, 19b. The members 18a and 18b extend upwardly at an angle of 60° and then curve inwardly parallel to base portions 17a, 17b to be joined by transverse portion 21. The base 16, inclined members 18a, 18b and the transverse portion 21 may comprise a unitary formed stainless steel or similar metal wire structure preferably ranging from of 0.046 to 0.312 inches.

A plurality of spaced U-shaped members 22a–g are attached to the transverse portion 21 at the open ends 25 of the U-shapes 22a–g. The legs 23a–k extend at an angle of 60° to the inclined members 18a, 18b and are parallel to the base 16. The legs 23a–k of the U-shapes 22a–g are mounted to the transverse portion 21 and form slots 12a–f between adjacent U-shaped members 22a–g. The U-shaped members 22a and 22g at the ends of the rack 10 are smaller than members 12b–e. The slots 12a–f are parallel to one another and are approximately 0.250–1.500 inches and preferably ⅝ inches wide and 2–8 inches long to accommodate the leg joints 13 which are normally larger than slots 12a–f. The ends of the U-shaped members 22a–g are curved to facilitate entry of the chicken legs 11 with a 0.3125 radius for members 22a and 22g and a 0.3125 radius for members 22b–f. The U-shaped members comprise a stainless steel wire 0.93 inches in diameter.

The perpendicular height of the inclined members is 6 inches and the legs 23a–k extend outwardly at a 60° angle from the transverse portion 21. Thus, the vertically held legs and the meaty portion 15 drip into a fire (not shown) without causing flare-ups. A plurality of legs 11 may be held in each slot.

In operation, each chicken leg 11 is inserted into a slot 22a–g with the leg joint 13 holding the leg 11 in position with the meaty portion extending vertically downward from the slot 22a–g. The suspended legs 11 on the rack 10 are then placed on the grill with the base 16 resting on the grill. The cover is then closed for a predetermined time at a preset temperature. The legs 10 are uniformly cooked for twenty-five to forty-five minutes in the vertical position which minimizes the potential for flare-up and burning.

The lightness and shaped wire design of the rack are distinctive advantages. Indeed the rack 10 could be redesigned to collapse for storage purposes with pivotal joints at the corners. In a further embodiment, the wire rack 10 could be pivotally mounted to the interior of the barbecue cover to swing into and out of a cooking position when the cover is opened or closed. The invention could be secured or attached to the base of the grill. Further design changes would affect the wire angles noted in the preferred embodiment which could range upward of 90°. Also the U-shaped members may range from 2–15.

While the invention has been explained by a detailed description of certain specific embodiments, it is understood that various modifications and substitutions can be made in any of them within the scope of the appended claims which are intended also to include equivalents of such embodiments.

What is claimed is:

1. A rack for grilling chicken legs in a vertical position on a barbecue with the leg joint on the upper end and the meaty portion at the lower end comprising:

a base for mounting on a barbecue including a first end portion and a second end portion extending inwardly towards one anther for a predetermined distance, a portion extending perpendicularly to each end portion and a transverse portion joining said perpendicular portions a pair of inclined portions each extending upward from an end portion and including a transverse portion joining said inclined portions at an predetermined distance above said base; and, a plurality of spaced U-shaped members each having a pair of legs and a base joining said legs, said legs being mounted to transverse portion at spaced intervals forming a slot between adjacent legs to hold the leg joint of a chicken leg.

2. A rack for grilling chicken legs in accordance with claim 1 wherein:

the base, inclined portions, transverse portion and U-shaped members comprise metal wires of predetermined diameter.

3. A rack for grilling chicken legs in accordance with claim 2 wherein:

the base, transverse portion and inclined portions comprise a metal wire having a diameter of 0.125 inches; and, the U-shaped members comprise a metal wire having a diameter of 0.093 inches.

4. A rack for grilling chicken legs in accordance with claim 1 wherein:

the plurality of U-shaped members comprise at least 7 said members, the members adjacent each end portion being narrower than the intermediate members.

5. A rack for grilling chicken legs in accordance with claim 4 wherein:

the U-shaped members range from 2 to 15.

6. A rack for grilling chicken legs in accordance with claim 4 wherein:

the base of the intermediate U-shaped members comprises a radius of 0.750 inches and the base of the members adjacent each end portion comprising a radius of 0.3125 inches.

7. A rack for grilling chicken legs in accordance with claim 1 wherein:

the inclined portions extend upwardly at an angle of 60 degrees to the base and the U-shaped members extend outwardly from the transverse portion at an angle of 60 degrees to the inclined portion and parallel to the base.

8. A rack for grilling chicken legs in accordance with claim 2 wherein:

the first and second end portions extend inwardly towards one another for a predetermined distance in the same plane and the perpendicular portions extend parallel to each other at a spaced distance apart and the transverse portion extends parallel thereto.

9. A rack for grilling chicken legs in accordance with claim 2 wherein:

the base, inclined portions and the transverse portion comprise a unitary formed wire structure.

10. A rack for grilling chicken legs in accordance with claim 1 wherein:

the rack includes pivotal means so that the base, inclined portions and U-shaped members may be folded in a substantially flat structure.

11. A rack for grilling legs in accordance with claim 1 wherein:

the slots are each sized to accommodate a plurality of legs.

* * * * *